April 3, 1928.
C. A. FLEMING
1,664,974
TRACTOR SWEEP RAKE
Original Filed Nov. 18, 1925   2 Sheets-Sheet 2
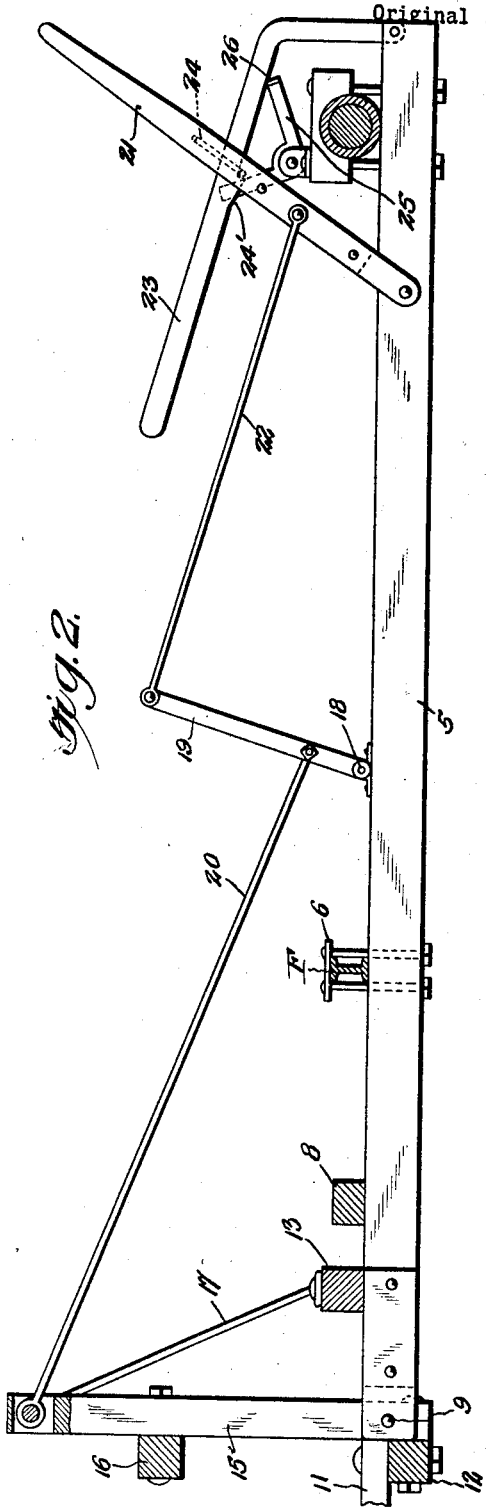
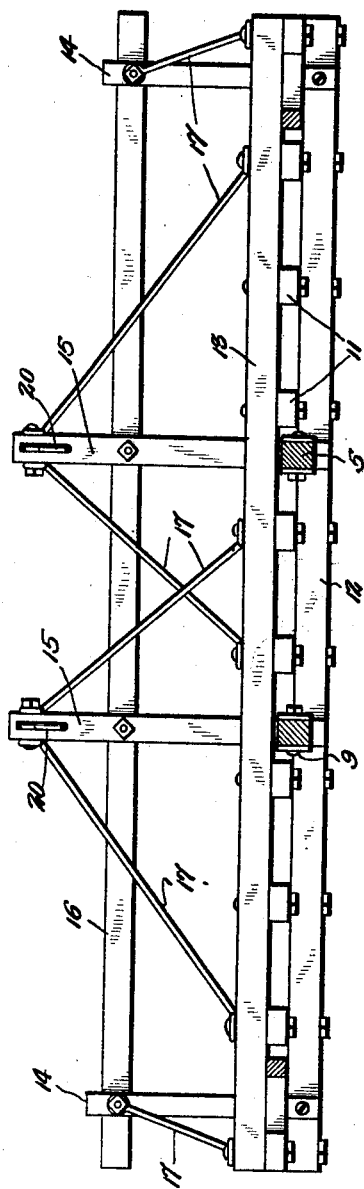
Inventor
Clifford A. Fleming,
By L. B. James
Attorney Patented Apr. 3, 1928.

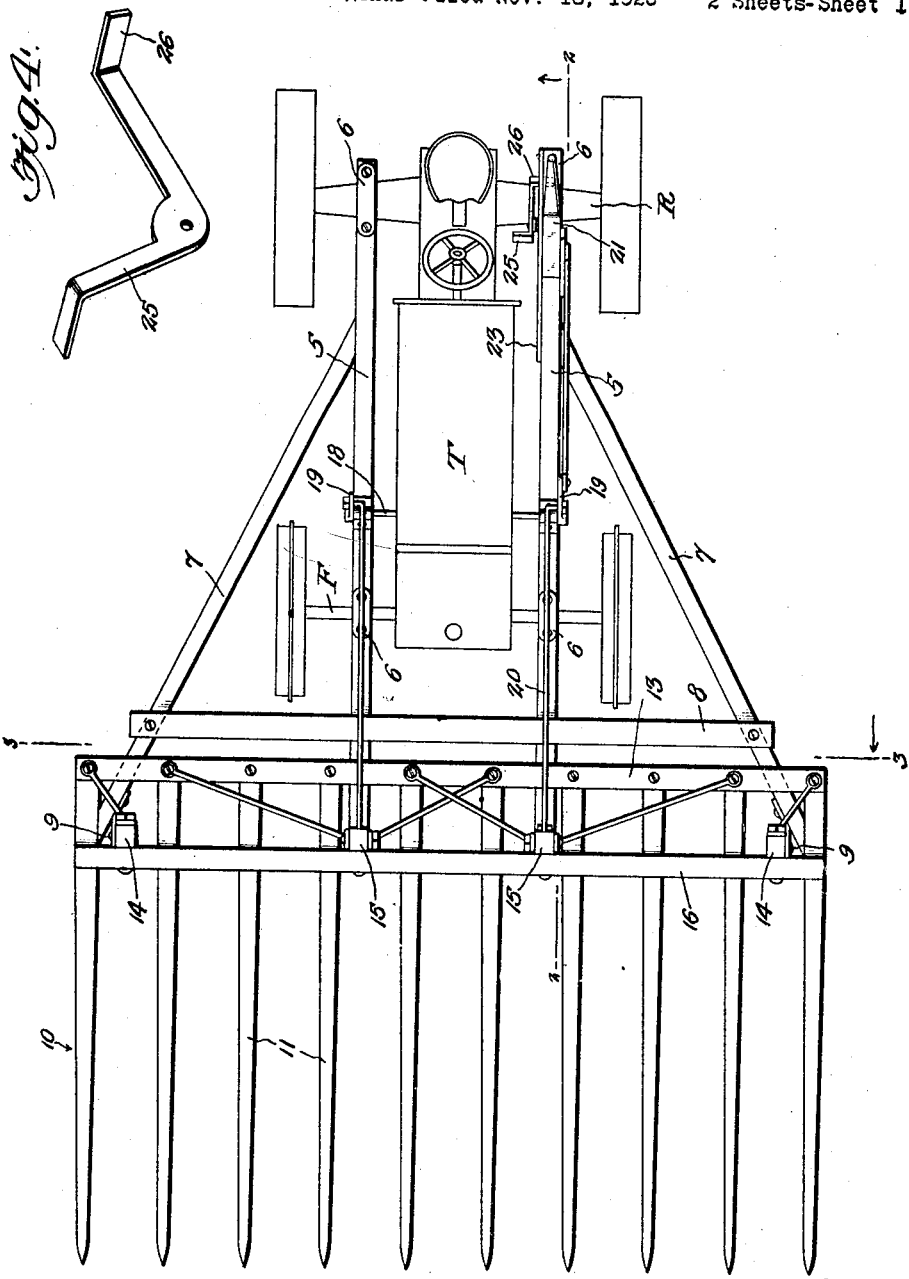

1,664,974

UNITED STATES PATENT OFFICE.

CLIFFORD A. FLEMING, OF HUNTSVILLE, MISSOURI.

TRACTOR SWEEP RAKE.

Application filed November 13, 1925, Serial No. 69,901. Renewed December 13, 1927.

This invention relates to rakes and more particularly to tractor sweep rakes.

The primary object of this invention resides in the provision of a sweep rake adapted to be readily attached to a tractor so as to be manipulated by the attendant of the tractor without leaving his position for operating the tractor.

Another object of this invention resides in the provision of a sweep rake adapted to be associated with tractor through the instrumentality of a frame rigidly connected to the tractor and supporting means for manipulating the rake tines.

A further object of this invention resides in the provision of a sweep rake hingedly connected to a frame which supports means for manipulating the rake tines toward and from the ground.

A still further object of this invention resides in the provision of a sweep rake hingedly connected to a frame which is in turn detachably secured to the front and rear axles of a tractor and braced against lateral strain.

In addition to the aforesaid objects, this invention resides in the provision of a sweep rake consisting of a tine section provided with standards, adjacent pivotal connections to a frame section, which are substantially braced so as to withstand both lateral and rearward strain to which they may be subjected.

Aside from the foregoing objects, this invention resides in the provision of a sweep rake comprising a tine section pivotally connected to a frame section and manipulated by suitable levers which are manually controlled for operating the tine section and disposed for quick release while retaining the rake tines in elevated position.

With these and other objects in view, this invention resides in certain novel features of construction, arrangement and combination of elements to be hereinafter more particularly set forth in the specification, illustrated in the accompanying drawings and pointed out in the appended claim and, while the disclosure depicts my present conception of the invention, the right is reserved to make such changes in construction as come within the scope of the claim.

In the accompanying drawings forming a part of this application:

Fig. 1 is a plan view of a sweep rake connected to a conventional type of tractor;

Fig. 2 is an enlarged sectional view on line 2—2 of Fig. 1;

Fig. 3 is a sectional view on line 3—3 of Fig. 1;

Fig. 4 is a detail perspective view of the quick releasing treadle.

In the present illustration of this invention the letter T designates a conventional type of tractor which, among other important elements comprising the same, consists of a front axle F and rear axle R.

Preferably passing beneath the front and rear axles of the tractor inwardly of the wheels thereof are longitudinally extending beams 5, the same are adapted to be secured to the axles by suitable fastening elements 6 with their forward ends projecting an appreciable distance in front of the tractor.

Diverging forwardly from the aforesaid beams 5 are braces 7 which extend outwardly of the front wheels of the tractor and are connected by a laterally extending cross-bar 8 lying in close proximity to the forward portions of the front wheels of the tractor.

Hingedly connected to the forward ends of the beams 5 and braces 7, as by suitable pivotal elements 9, is a tine section 10, the same preferably consisting of a plurality of tines 11 connected adjacent their inner ends by a lateral beam 12 disposed on the under surfaces of the tines and a similar beam 13 disposed on the upper surfaces of the tines in close proximity to their inner ends. With the beam 13 disposed on the upper surfaces of the tines at their innermost ends and inward of their pivotal connections, it will act as a stop when rocking the tines to elevated position, particularly so on account of the beam coming in contact with the upper surfaces of the beams 5 and braces 7.

Secured to the beam 12, adjacent its outer ends, are short and long standards 14 and 15, the length of the latter of which is determined by the degree of leverage desired beyond the pivotal connections of the tine section. These standards are connected by a beam 16 and braced by rods or other suitable elements 17 from the beam 13, said brace rods 17 being disposed to brace the standards against lateral and rearward strain so as to withstand the strain exerted thereagainst in elevating the tines with a load thereon.

Journalled on the beam 5 is a rock-shaft 18 having cranks 19, keyed or otherwise fixed thereto, which are connected to the standards 15 by links 20. Said rock-shaft is adapted to be manipulated through the instrumentality of a lever 21 connected to one of the cranks by a link 22.

The aforesaid lever is associated with a pivotal rack-bar 23 which passes through a yoke 24 carried by the lever. The base of the yoke is adapted to engage the rack tooth 24 of the lever and act as stop for retaining the lever in its rearmost position and, in order to facilitate quick release of the lever, a treadle 25 having an arm 26 disposed beneath the rack-bar 23 is provided whereupon manipulation of the same will readily disengage the tooth of the rack-bar from the yoke of the lever and permit the rack tines to gravitate.

With this invention fully set forth, it is manifest that a sweep rake of substantial construction is provided and, through the provision of the particular association of elements, the same can be readily attached to a tractor in rigid relation thereto and operated with the minimum exertion by a single individual.

Having thus described my invention, what I claim and desire to protect by Letters Patent is:

A sweep rake of the character set forth, the combination of a frame section, means rigidly and detachably securing the frame to the forward and rear axles of a tractor, a tine section, forwardly and outwardly diverging braces extending from the intermediate portion of the frame with their outermost portions disposed under the inner corners of the tine section, pivotal elements connecting the tine section to the frame and braces intermediate their outermost ends, and elevating means connected to the tine section.

In testimony whereof I affix my signature.

CLIFFORD A. FLEMING.